UNITED STATES PATENT OFFICE.

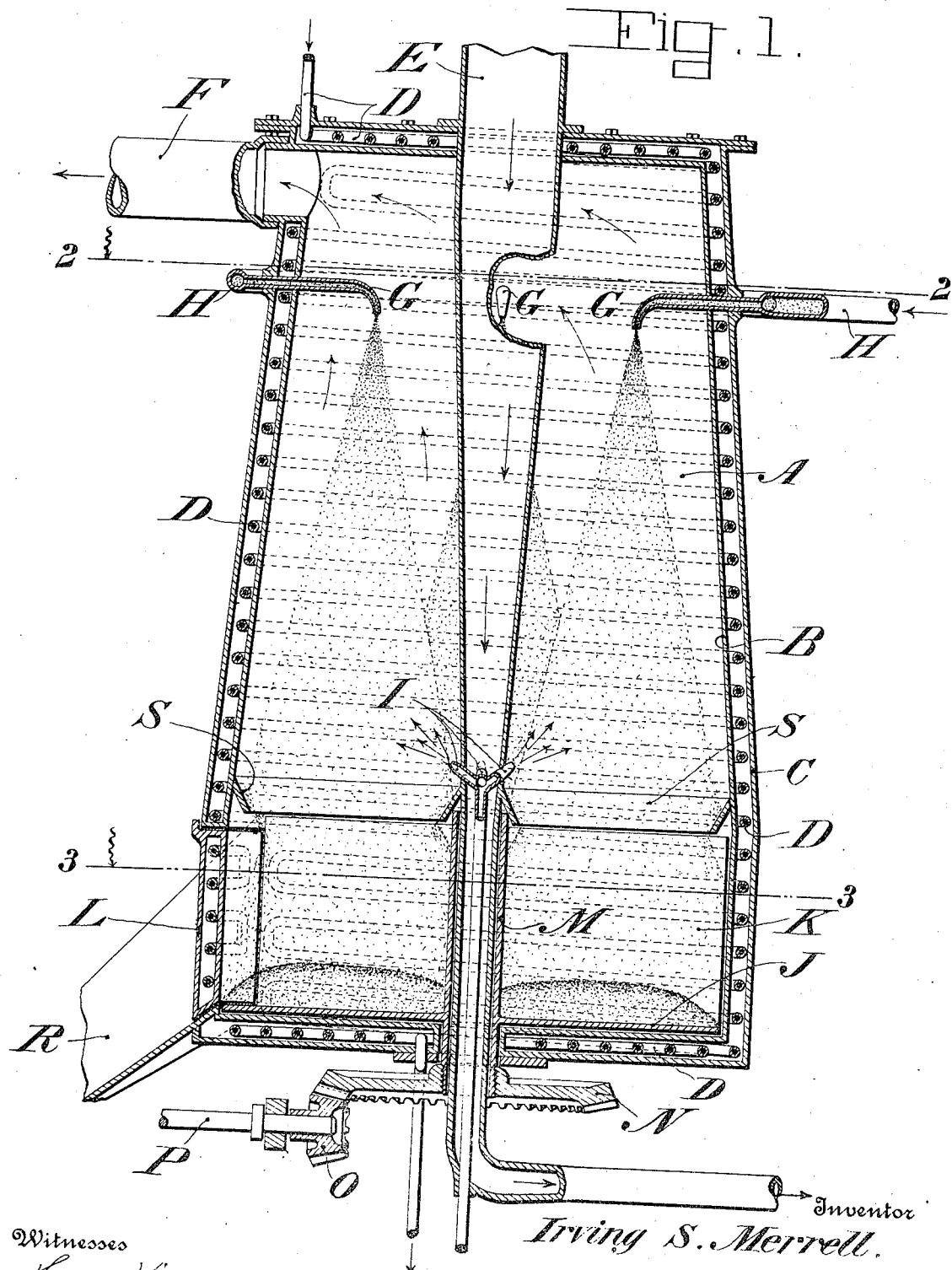

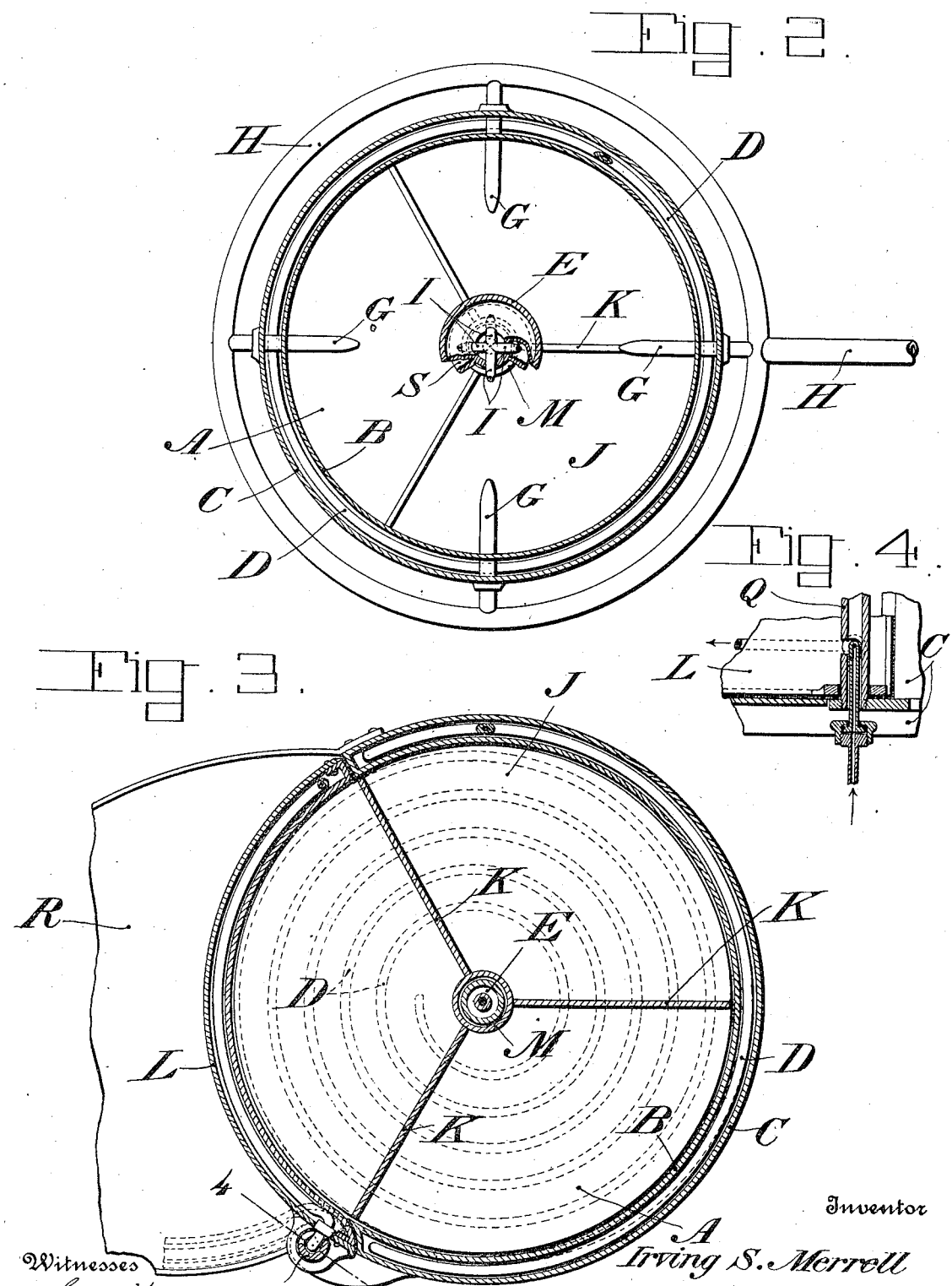

IRVING S. MERRELL, OF SYRACUSE, NEW YORK.

METHOD OF DESICCATING.

1,133,051.
Specification of Letters Patent.
Patented Mar. 23, 1915.

Application filed December 8, 1913. Serial No. 805,424.

*To all whom it may concern:*

Be it known that I, IRVING S. MERRELL, of Syracuse, in the county of Onondaga and State of New York, have invented a new and Improved Method of Desiccating, of which the following is a specification.

It has heretofore been proposed to desiccate liquids containing solids (such as milk, for example) by spraying the liquid into a chamber in which a partial vacuum is maintained, the walls of the chamber being heated or heat insulated. Such methods have proven impracticable because a partial vacuum is an excellent non-conductor of heat and it has been found impossible to transmit the requisite amount of heat to the sprayed liquid to effect the desiccation in connection with the vacuum. The theory of desiccating in a vacuum is correct because of the relatively low temperature at which the drying can be carried out with the result that the products of the desiccating process are not affected. This is particularly true in the case of milk and other highly organized substances having a large moisture content, such as eggs, because such substances if subjected to air at high temperatures are affected in their qualities as the air and high heat tends to oxidize the product and the result is to injure the flavor and keeping quality of the dry product.

The present invention has for its primary object the supply of the requisite number of heat units to effect desiccation in a heated chamber in which a high degree of vacuum is maintained. This is accomplished by injecting into the chamber steam which supplies the required heat units and which is highly superheated so that its reduction in temperature due to the minus pressure is not sufficient to cause condensation within the chamber. The walls of the vacuum chamber are maintained at a sufficiently high temperature to prevent any condensation upon them of the steam under the low pressure maintained in the vacuum chamber by either heating the walls themselves or by heat insulating them. The liquid to be desiccated is sprayed into the chamber in a fine spray so that all portions of the spray are subjected to the heat supplied by the superheated steam.

An apparatus for carrying out the invention is illustrated in the accompanying drawings in which—

Figure 1, is a vertical section of the apparatus. Fig. 2, is a horizontal section in the plane indicated by the line 2—2 in Fig. 1. Fig. 3, is a horizontal section in the plane indicated by the line 3—3 in Fig. 1. Fig. 4, is a detail of the hinge of the door which permits the dry powder to be withdrawn.

An apparatus with heated instead of insulated walls is shown.

The desiccating chamber A, has double walls B, and C, separated so as to insulate the chamber, and in the space between the two walls are located steam coils D, through which steam flows for the purpose of maintaining the inner wall B, of the desiccating chamber sufficiently warm to prevent any condensation on its inner surface. A steam conduit E, extends vertically through the middle of the desiccating chamber and through this steam also flows. This steam conduit E, forms a channel through which to introduce the superheated steam supply without having it unduly heat the walls of the chamber at any point.

The desiccating chamber has an outlet F, near its top which is in communication with a powerful vacuum pump which maintains a low minus pressure within the condenser and vacuum chamber. The condenser, vacuum chamber and vacuum pump are not shown, being of well-known construction. The lower the pressure the better are the results. It is desirable to maintain the vacuum between twenty to twenty-eight inches of mercury. This may vary, depending upon the materials treated, but the vacuum should never be less than sufficient to maintain a temperature which will not injure the dry product. For instance, skim milk can be dried at one hundred and eighty (180) degrees Fahrenheit without perceptible injury if removed from the chamber at frequent intervals. Eggs can be dried with the temperature of one hundred and fifty (150) degrees Fahrenheit if the powder is removed frequently and then cooled. The amount of vacuum used, therefore, depends upon the substance treated. As a general rule, the less the pressure the more efficient the action is.

The milk or other liquid to be treated is sprayed into the vacuum chamber. Conventional spraying nozzles are indicated at G, four being shown, all of which are connected to a supply pipe H. Hydraulic pressure spraying is indicated. The character of hydraulic pressure spraying nozzles which are used is illustrated in the United States Letters Patent of Bevenot and de Neveu, No. 1,020,632, March 19, 1912. By use of such spraying nozzles an exceedingly fine and well distributed spray is produced.

The central steam conduit contracts downwardly and the external walls of the desiccating chamber expand downwardly so as to provide increasing area for the spread of the spray as it is projected downwardly from the spraying nozzles. Near the lower end of the desiccating chamber superheated steam is introduced through steam nozzles I. The steam should be at a very high temperature, say in the neighborhood of seven hundred degrees Fahrenheit in order to supply the necessary number of heat units. The globules of the spray are cooled by the exceedingly rapid evaporation due to the high temperature of the superheated steam, and the heat for this rapid evaporation is taken from the superheated steam and used in turning the liquid of the material to be desiccated into vapor. Enough steam is admitted, and at a sufficient temperature, to keep the resulting temperature of the vapor as it leaves the chamber at a few degrees above the saturation temperature for the vacuum being carried.

The dry powder falls into a collecting drum J, at the bottom of the desiccating chamber. This drum has several compartments, as illustrated in Fig. 3, and it is rotatable so as to bring the different compartments constituted by the partitions K, into register with a door L, at one side of the chamber. The drum is rotated by any suitable means. As shown, the central hollow shaft M, extends below the bottom of the desiccating chamber, and has a gear wheel N, which meshes with the pinion O, on the operating shaft P, which can be turned in any convenient way, as by a crank handle (not shown). The door L, swings open on a hollow hinge Q. The dry powder removed falls down an inclined chute R, to a receiving receptacle. The door is jacketed and heated, steam being introduced through its hollow hinge Q, as shown in Fig. 4. The door is held closed tight by the interior vacuum so as to prevent any loss of vacuum. A shield S, prevents any powder from coming between the central shaft M, of the collector and the interior steam conduit E.

I claim—

1. The method of desiccating organic liquids containing a high moisture content which consists in spraying the liquid into a chamber in which a high degree of vacuum is maintained, injecting into said chamber highly superheated steam, the temperature of the steam being sufficiently high so that it will not condense within the chamber at the minus pressure maintained therein, and preventing condensation within the chamber by heating the walls thereof.

2. The method of desiccating organic liquids containing a high moisture content which consists in spraying the liquid into a chamber in which a high degree of vacuum is maintained, and injecting into said chamber superheated steam, the temperature of the steam being sufficiently high so that it will not condense within the chamber at the minus pressure maintained therein.

In witness whereof, I have hereunto signed my name in the presence of two subscribing witnesses.

IRVING S. MERRELL.

Witnesses:
C. L. Williams,
J. S. Barnes.